United States Patent [19]
Sakoda et al.

[11] Patent Number: 5,306,599
[45] Date of Patent: Apr. 26, 1994

[54] OPTICAL RECORDING MATERIAL

[75] Inventors: Kazuaki Sakoda; Masayuki Maeda; Masao Iwamoto, all of Otsu, Japan

[73] Assignee: Toray Industries, Inc., Japan

[21] Appl. No.: 73,971

[22] Filed: Jun. 8, 1993

Related U.S. Application Data

[63] Continuation of Ser. No. 843,556, Feb. 28, 1992, abandoned.

[30] Foreign Application Priority Data

Mar. 1, 1991 [JP] Japan ............................ 3-036393
Sep. 24, 1991 [JP] Japan ............................ 3-243155

[51] Int. Cl.$^5$ ............................................ G11B 7/24
[52] U.S. Cl. ............................ 430/270; 430/495; 430/945; 365/119
[58] Field of Search ............ 430/945, 495, 370; 346/135.1; 365/119; 369/102

[56] References Cited

U.S. PATENT DOCUMENTS

| | | | |
|---|---|---|---|
| 4,101,976 | 7/1978 | Castro et al. | 365/119 |
| 4,639,329 | 1/1987 | Makishima et al. | 252/501.1 |
| 5,051,337 | 9/1991 | Sakoda et al. | 430/270 |

FOREIGN PATENT DOCUMENTS

| | | |
|---|---|---|
| 1-152452 | 6/1989 | Japan . |
| 1-163740 | 6/1989 | Japan ............................ 430/495 |
| 1-291246 | 11/1989 | Japan . |
| 2-127079 | 5/1990 | Japan . |
| 2-259750 | 10/1990 | Japan . |
| 3-015045 | 1/1991 | Japan ............................ 430/270 |
| 3-024082 | 2/1991 | Japan . |
| 5-011402 | 1/1993 | Japan . |
| 88009957 | 12/1988 | World Int. Prop. O. . |

OTHER PUBLICATIONS

English language Abstract of JP 01-163740, Kominami et al., "Porphin Type Recording Material", (Jun. 1989).

Primary Examiner—Charles L. Bowers, Jr.
Assistant Examiner—John A. McPherson
Attorney, Agent, or Firm—Austin R. Miller

[57] ABSTRACT

A material for optical recording by utilizing the photochemical hole burning is disclosed. The optical recording material is a composition comprising a watersoluble deuterated polymer as a host component and a water-soluble organic pigment dispersed in the host component as a guest component. By virtue of the deuteration of the host component, the tunnel effect of the hydrogen atoms in the host component is prevented, so that the hole width is narrowed. Thus, the wavelength multiplicity is increased.

25 Claims, 2 Drawing Sheets

OPTICAL RECORDING MATERIAL

This application is a continuation of Application Ser. No. 07/843,556, filed Feb. 28, 1991.

BACKGROUND OF THE INVENTION

I. Field of the Invention

This invention relates to a material for optical recording utilizing photochemical hole burning.

II. Description of the Related Art

Materials for optical recording utilizing the photochemical hole burning (PHB) phenomenon are known. These optical recording materials comprise a matrix component called a host component and a photoreactive compound called a guest component which undergoes photochemical reaction upon absorbing photoenergy. By irradiating the recording material with light having high monochromaticity at an extremely low temperature (about the temperature of liquid helium), only the guest component molecules which absorb the light are selectively excited, so that a sharp hole is formed in the absorption spectrum. Thus, based on the presence or absence of such a hole, optical recording can be accomplished under photon mode. Further, by sequentially recording information changing the wavelength of the irradiating light, multiple recording can be made on the same place of the same recording material. Therefore, a high recording density of about as much as 1000 times that attained by the conventional optical digital recording such as compact disk (CD) or laser disk (LD) may potentially be attained.

To increase the wavelength multiplicity for increasing the recording density, it is preferable to employ an amorphous medium as the host component in order to give diversity of the state of dispersion of the guest component. Therefore, organic polymers and silicate glass have been employed as the host component. The conventional PHB materials include a material containing tetraphenylporphine as the guest component and polymethyl methacrylate as the host component (Japanese Journal of Optics, 14(4)263-269, 1985), a material containing quinizarin as the guest component and silicate glass as the host component (Journal of Applied Physics, 58(9)3559-3565, 1985), a material containing free base porphine as the guest component and an aliphatic hydrocarbon as the host component, a material containing Cresyl Violet as the guest component and polyvinyl alcohol (PVA) as the host component, and a material containing phthalocyanine as the guest component and an aliphatic hydrocarbon as the host component.

However, the PHB phenomenon with these conventional PHB materials is unstable at a temperature higher than the temperature of liquid helium, so that recording, storing and reading information are unreliable at such a high temperature. This is due to the fact that an irreversible change in the structure of the PHB material occurs, so that the microscopic structure in the vicinity of the guest component is changed. To overcome this problem of thermal unstableness, a PHB material containing an ionic porphine derivative as the guest component and an organic polymer as the host component was provided (U.S. Pat. No. 5,051,337, Japanese Laid-open Patent Application (Kokai) No. 2-45). Especially, with the PHB material employing polyvinyl alcohol as the host component, since the structural change of the material is inhibited by the hydrogen bonds formed among the host component molecules, holes can be formed at a temperature as high as the temperature of liquid nitrogen.

However, such PHB materials containing a porphine derivative as the guest and a polymer as the host have a drawback in that the hole width is large, so that the wavelength multiplicity which is the most advantageous feature of the PHB materials is reduced.

As for the temperature characteristics of the PHB materials, Thijssen et al reported the formation of holes at a temperature lower than 30K (Chemical Physics Letters, 92(1), 7-12, 1982), Tani et al reported storage of holes at a temperature lower than 60K (Journal of Applied Physics, 58(9), 3559-3565, 1985), and Sakoda et al reported the PHB phenomenon at temperatures not lower than the temperature of liquid nitrogen of the above-mentioned material containing a porphine derivative having an ionic substituent as the guest and PVA as the host (Japanese Journal of Applied Physics, 28 Supplement 28-3, 229-233, 1989). On the other hand, Friedrich et al reported the PHB of the material containing quinizarin as the guest dispersed in deuterated ethanol. However, they found no significant differences between the PHB phenomena when the deuterated ethanol and ordinary ethanol are used, respectively.

SUMMARY OF THE INVENTION

Accordingly, an object of the present invention is to provide a PHB material in which the hole width is narrower than with the conventional materials.

The present inventors intensively studied to find that by employing a water-soluble deuterated polymer as the host component and a water-soluble organic pigment as the guest component, the hole can be made narrow, thereby completing the present invention.

That is, the present invention provides an optical recording material which is a composition comprising a water-soluble deuterated polymer as a host component and a water-soluble organic pigment dispersed in the host component as a guest component.

By the present invention, a PHB material having a narrower the hole width than the conventional PHB materials was provided. The hole width in the PHB material in the recording material of the present invention is narrower than in the conventional PHB materials presumably because the tunnel effect of the hydrogen atoms in the host component is inhibited. Since the hole is narrow, the wavelength multiplicity is high, so that high density recording may be attained by virtue of the present invention.

DETAILED DESCRIPTION OF THE PREFERRED EMBODIMENTS

As stated above, the optical recording material of the present invention is a composition comprising a water-soluble deuterated polymer as a host component and a water-soluble organic pigment dispersed in the host component as a guest component. By virtue of the fact that the hydrogen atoms formerly in the host polymer are substituted by deuterium atoms, the tunnel effect is inhibited so that the hole is narrowed. As a result, the wavelength multiplicity of the PHB recording is increased. Since both the guest component and the host component are water-soluble, the guest component may easily be well dispersed in the host component such that each individual molecule of the guest component is distributed in the host component. As a result, the PHB phenomenon is certain to occur. Contrary to the present invention, if a deuterated low molecular compound is used as the host component, the tunnel effect and the molecular movement of the recording material are not well inhibited.

Preferred water-soluble organic pigments which may be employed in the present invention include water-soluble porphine derivatives; water-soluble phthalocyanine derivatives; water-soluble xanthene pigments such as salts (e.g., disodium salts) of fluorescein represented by the formula [I] and Rhodamine 560 represented by the formula [II]; water-soluble oxazine pigments such as Nile Blue represented by the formula [III]; and water-soluble thiazine pigments such as Methylene Blue represented by the formula [IV].

The water-soluble porphine derivatives and the water-solbule phthalocyanine derivatives which may be used as the guest component may preferably have one or more ionic substituents in the molecule. The ionic substituent may be cationic, anionic or an amphoteric.

Preferred examples of the cationic substituent include quaternary amino groups and pyridinium group. Especially preferred examples of the porphine derivatives having such cationic substituents include 5,10,15,20-tetra (4-N,N,N-trialkylaminophenyl)porphine represented by the formula [V] and 5,10,15,20-tetra(4-N-alkylpyridinium]porphine represented by the formula [VI].

The groups $R_1$-$R_{12}$ in the formula [V] and the groups $R_{13}$-$R_{16}$ in the formula [VI] independently represent alkyl groups. The porphine derivative represented by the formula [V] is preferred because the porphine ring and the quaternary amino groups are separated by the phenyl groups, so that the cationic substituents hardly affect the photochemical reaction of the porphine ring. Similarly, the porphine derivative represented by the formula [VI] is preferred because the electric charge of the pyridinium group is distributed in the conjugated system, so that the cationic substituents hardly affect the photochemical reaction of the porphine ring. The groups $R_1$-$R_{12}$ in the formula [V] and the groups $R_{13}$-$R_{16}$ in the formula [VI] are most preferably methyl groups. This is because methyl group are the most compact and so the degree of freedom in the movement when the guest component is dispersed in the host component is small, so that it is thought that irreversible structural changes are unlikely to occur. The porphine derivatives and phthalocyanine derivatives having one or more cationic substituents exist in the recording material together with one or more appropriate anions.

The anion may appropriately be selected depending on the miscibility with the host component. Preferred examples of the anion may include p-toluenesulfonate ion, $I^-$, $Br^-$, $Cl^-$, $ClO_4^-$, $CH_3COO^-$ and $BF_4^-$.

Preferred examples of the anionic substituent in the porphine derivatives and phthalocyanine derivatives include $SO_3^-$, $COO^-$ and $O^-$. These anionic substituents are preferred because they are stably retained in the ionized state in the host component. Among the porphine derivatives having one of more anonic substituents, 5,10,15,20-tetra(4-sulfonatophenyl)porphine represented by the formula [VII], 5,10,15,20-tetra(4-carbonatophenyl)porphine represented by the formula [VIII] and 5,10,15,20-tetra(4-phenoxide)porphine represented by the formula [IX] are especially preferred.

-continued

[IX]

These porphine derivatives are preferred because the porphine ring and the anionic substituents are separated by the phenyl group, so that the anionic substituents hardly affect the photochemical reaction of the porphine ring. The porphine derivatives and phthalocyanine derivatives having one or more anionic substituents exist in the recording material together with one or more appropriate cations. The cation may appropriately be selected depending on the miscibility with the host component. Preferred examples of the cation may include alkaline metal ions, hydrogen ion, alkaline earth metal ions and ammonium ion.

Preferred examples of the porphine derivatives having one or more amphoteric substituents include tetra[3-(N-sulfonatoalkyl-N-alkylamino)phenyl]porphine, tetra[3-(N-carbonatoalkyl-N-alkylamino)phenyl]porphine, tetra[4-(N-sulfonatoalkyl)pyridinium]porphine and tetra[4-(N-carbonatoalkyl)pyridinium]porphine.

5,10,15,20-tetra(4-N,N,N-trialkylaminophenyl)porphine represented by the formula [V] may be prepared by hydrolyzing 5,10,15,20-tetra(4-acetoaminophenyl)porphine prepared from acetoaminobenzaldehyde and pyrrole and then reacting the resultant with a tetraalkylating agent such as alkyl iodide. 5,10,15,20-tetra(4-N-alkylpyridinium)porphine may be prepared by alkylating 5,10,15,20-tetra(4-pyridyl)porphine with a tetraalkylating agent such as alkyl iodide. The porphine derivatives having anionic substituents represented by the formula [VII], [VIII] or [IX] may be prepared by reacting 5,10,15,20-tetraphenylporphine with a polybasic acid. Alternatively, they may be prepared from precursors synthesized from benzaldehyde derivatives having the anionic substituents and pyrrole.

As the host component, water-soluble deuterated polymers are employed. Examples of the water-soluble polymers which may be employed in the present invention include deuterated polyethylene oxide, deuterated polyvinylpyridine, deuterated polyvinylpyrrolidone, deuterated polyhydroxyethylmethacrylate, deuterated polyacrylic acid, deuterated polymethacrylic acid, deuterated polyacrylamide, deuterated polymethacrylamide, deuterated polyallylamine, deuterated polyvinylamine, deuterated polyvinyl alcohol and the like. Among these, hydrogen bonding polymers, that is, the polymers which can make hydrogen bonds are preferred. Examples of the hydrogen bonding water-soluble polymers which may preferably be employed in the present invention include deuterated polyhydroxyethylmethacrylate, deuterated polyacrylic acid, deuterated polymethacrylic acid and deuterated polyvinyl alcohol. Hydrogen bonding polymers are preferred because the molecular movement of the recording material is inhibited by the hydrogen bonds. As for the degree of deuteration, not less than 70%, more preferably not less than 90% of hydrogen atoms not engaging in hydrogen bond are preferably substituted with deuterium atoms. The hydrogen atoms engaging in the hydrogen bonds are not necessarily substituted with deuterium atoms since their molecular movement is inhibited by the hydrogen bonds. The molecular weight of the water-soluble deuterated polymers is not restricted, and may be, for example, 10,000 to 1,000,000.

Such deuterated water-soluble polymers may be prepared by the polymerization of deuterated monomers. For example, deuterated polyvinyl alcohol may be prepared by radical polymerizing deuterated vinyl acetate and then saponifying the resulting polymer. Deuterated vinyl acetate may be prepared by reacting deuterated acetylene formed by the reaction between carbide and heavy water with deuterated acetic acid in the presence of a zinc salt catalyst in gas phase.

The concentration of the guest component in the recording material of the present invention may preferably be $10^{-1}$–$10^{-5}$ M, more preferably $10^{-2}$–$10^{-4}$ M based on the volume of the host component. If the concentration of the guest component is too high, the hole-forming characteristics are degraded due to the energy transfer among the guest component molecules, and if the concentration is too low, the S/N ratio when reading the stored information is made small.

The invention will now be described by way of examples thereof. It should be noted that the examples are presented for the illustration purpose only and should not be interpreted in any restrictive way.

Example 1

Deuterated acetylene (DC≡CD) prepared from heavy water and carbide was reacted with chloroacetic acid-d$_1$ (ClCH$_2$CO$_2$D) in the presence of mercury oxide catalyst to synthesize vinyl chloroacetate-d$_3$ (CD$_2$=CDCO$_2$CH$_2$Cl)(The symbol "—d$_3$" means that the vinyl chloroacetate molecule has three deuterium atoms. The number of deuterium atoms in a molecule or in a repeating unit of a polymer will be indicated in the similar manner). The formation of vinyl chloroacetate-d₃ was confirmed by the analysis of GLC and ¹H-NMR. The rate of deuteration was 97%. The thus obtained vinyl chloroacetate-d₃ was polymerized by using AIBN as a polymerization initiator, and the polymerization product was purified to obtain deuterated polyvinyl chloroacetate. The thus obtained deuterated polyvinyl chloroacetate was saponified in distilled water to obtain deuterated PVA-d₃ represented by the formula [X].

[X]

Figure 1:
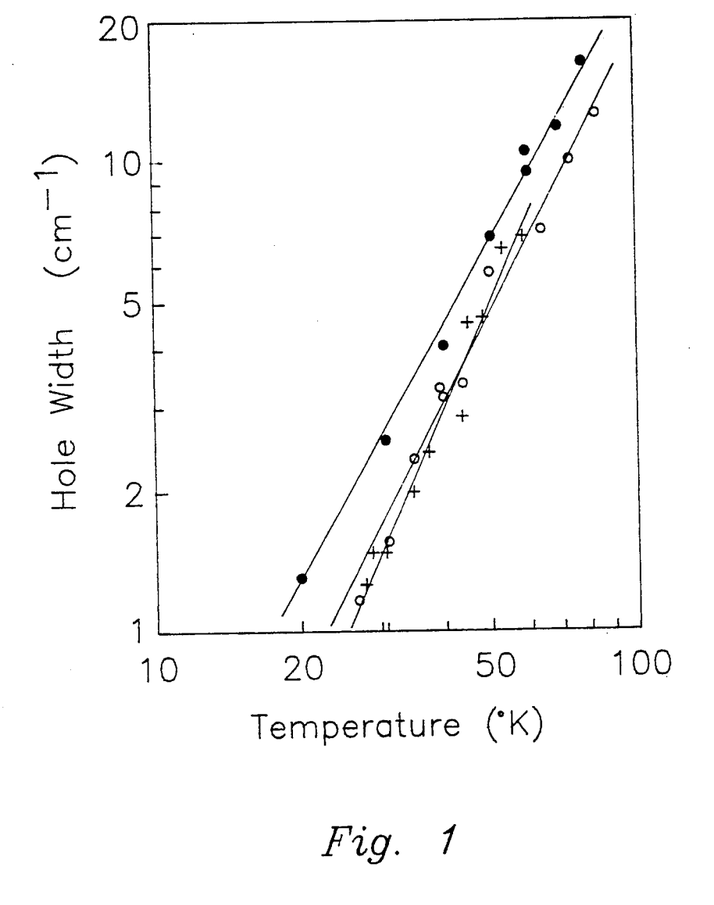
FIG. 1 shows the relationships between the temperature and the hole width of the holes formed in the samples of the Examples of the present invention and in a sample of a Comparative Example.

An aqueous solution containing 10 mg of tetrasodium 5,10,15,20-tetra(4-sulfonatophenyl)porphine (TSPP(Na) dodecahydrate, commercially available from Wako Pure Chemical Industries) in distilled water and an aqueous solution containing 1 g of PVA-d₃ in distilled water were mixed and the mixture was stirred. This mixture was dried in nitrogen atmosphere to obtain a sample of TSPP(Na)/PVA-d₃ in the form of a film. The concentration of the guest component was 10 mM. This sample was irradiated with a laser beam having a wavelength of 641 nm and an intensity of 1 mW/cm² at various temperatures to form holes. The half widths of the holes were measured. The results are shown in FIG. 1, which will be later discussed.

EXAMPLE 2

The deuterated polyvinyl chloroacetate prepared in Example 1 was saponified in heavy water to obtain deuterated PVA-d₄ represented by the formula [XI].

[XI]

A solution containing 10 mg of TSPP(Na) dodecahydrate in heavy water and a solution containing 1 g of PVA-d₄ in heavy water were mixed and the mixture was stirred. This mixture was dried in nitrogen atmosphere to obtain a sample of TSPP(Na)/PVA-d₄ in the form of a film. The concentration of the guest component was 10 mM. By the proton exchange with heavy water, the hydrogen atoms in the porphine ring of TSPP(Na) were substituted with deuterium atoms. This sample was irradiated with a laser beam having a wavelength of 641 nm and an intensity of 1 mW/cm² at various temperatures to form holes. The half widths of the holes were measured. The results are shown in FIG. 1, which will be later discussed.

Comparative Example 1

An aqueous solution containing 10 mg of TSPP(Na) dodecahydrate in distilled water and an aqueous solution containing 1 g of PVA (degree of polymerization: 2000, degree of saponification: 100%, commercially available from Nakaraitesk) were mixed and the mixture was stirred. This mixture was dried in nitrogen atmosphere to obtain a sample of TSPP(Na)/PVA in the form of a film. The concentration of the guest component was 10 mM. This sample was irradiated with a laser beam having a wavelength of 641 nm and an intensity of 1 mW/cm² at various temperatures to form holes. The half widths of the holes were measured.

The results of Examples 1 and 2 and Comparative Example 1 are shown in FIG. 1. In FIG. 1, the symbol " " shows the results of Example 1, the symbol " " shows the results of Example 2, and the symbol " " shows the results of Comparative Example 1. As can be seen from FIG. 1, the half widths of the holes formed in Examples 1 and 2 are smaller than those formed in Comparative Example 1 so that the wavelength multiplicities in Example 1 and 2 are about twice that in Comparative Example 1.

Example 3

5,10,15,20-tetra(4-carboxyphenyl)porphine (commercially available from Tokyo Kasei) was reacted with 4 equivalents of sodium hydroxide to obtain tetrasodium 5,10,15,20-tetra(4-carbonatophenyl)porphine (TCPP(Na)). A solution containing 0.7 mg of TCPP(Na) in heavy water and a solution containing 1 g of PVA-d₄ prepared in Example 2 in heavy water were mixed and the mixture was stirred. This mixture was dried in nitrogen atmosphere to obtain a sample of TCPP(Na)/PVA-d₄ in the form of a film. The concentration of the guest component was 1 mM. By the proton exchange with heavy water, the hydrogen atoms in the porphine ring of TCPP(Na) were substituted with deuterium atoms. This sample was irradiated with a laser beam having a wavelength of 640 nm and an intensity of 1 mW/cm² at 25K or 31K. The half widths of the holes were measured. The half hole widths were 1.4 cm⁻¹ and 1.9 cm⁻¹, respectively.

Comparative Example 2

An aqueous solution containing 0.7 mg of TCPP(Na) in distilled water and an aqueous solution containing 1 g of PVA in distilled water were mixed and the mixture was stirred. This mixture was dried in nitrogen atmosphere to obtain a sample of TCPP(Na)/PVA in the form of a film. The concentration of the guest component was 1 mM. This sample was irradiated with a laser beam having a wavelength of 640 nm and an intensity of 1 mW/cm² at 25K or 31K. The half widths of the holes were measured. The half hole widths were 1.8 cm⁻¹ and 2.7 cm⁻¹, respectively.

As can be seen, the hole widths in Example 3 are narrower than those in Comparative Example 2. Thus, it was proved that by the deuteration of the host component (PVA), the hole width is narrowed and so the wavelength multiplicity is increased.

Example 4

A solution containing 6 mg of 5,10,15,20-tetra(4-N,N,N-trimethylaminophenyl)porphine tetra(p-toluenesulfonate) (TMAP(PTS), commercially available from Dojindo Laboratories) in heavy water and a solution containing 1 g of PVA-d₄ in heavy water were mixed and the mixture was stirred. This mixture was dried in nitrogen atmosphere to obtain a sample of TMAP(PTS)/PVA-d₄ in the form of a film. The concentration of the guest component was 5 mM. By the proton exchange with heavy water, the hydrogen atoms in the porphine ring of TMAP(PTS) were substituted with deuterium atoms. This sample was irradiated with a laser beam having a wavelength of 643 nm and an intensity of 1 mW/cm² at 31K. The half hole width was measured, which was 1.8 cm⁻¹.

Comparative Example 3

An aqueous solution containing 6 mg of TMAP(PTS) in distilled water and an aqueous solution containing 1 g of PVA in distilled water were mixed and the mixture was stirred. This mixture was dried in nitrogen atmosphere to obtain a sample of TMAP(PTS)/PVA in the form of a film. The concentration of the guest component was 5 mM. This sample was irradiated with a laser beam having a wavelength of 643 nm and an intensity of 1 mW/cm² at 31K. The half hole width was measured, which was 2.4 cm⁻¹.

As can be seen, the hole width in Example 4 is narrower than that in Comparative Example 3. Thus, it was proved that by the deuteration of the host component (PVA), the hole width is narrowed and so the wavelength multiplicity is increased.

Example 5

An aqueous solution containing 5 mg of 5,10,15,20-tetra(4-N-methylpyridinium)porphine tetraiodide (TPyP-1(I), commercially available from Wako Pure Chemical Industries) in distilled water and an aqueous solution containing 1 g of PVA-$d_3$ in distilled water were mixed and the mixture was stirred. This mixture was dried in nitrogen atmosphere to obtain a sample of TPyP-1(I)/PVA-$d_3$ in the form of a film. The concentration of the guest component was 5 mM. This sample was irradiated with a laser beam having a wavelength of 642 nm and an intensity of 1 mW/cm² at 25K. The half hole width was measured, which was 1.4 cm⁻¹.

Comparative Example 4

An aqueous solution containing 5 mg of TPyP-1(I) in distilled water and an aqueous solution containing 1 g of PVA were mixed and the mixture was stirred. This mixture was dried in nitrogen atmosphere to obtain a sample of TPyP-1(I)/PVA in the form of a film. The concentration of the guest component was 5 mM. This sample was irradiated with a laser beam having a wavelength of 642 nm and an intensity of 1 mW/cm² at 25K. The half hole width was measured, which was 1.8 cm⁻¹.

As can be seen, the hole width in Example 5 is narrower than that in Comparative Example 4. Thus, it was proved that by the deuteration of the host component (PVA), the hole width is narrowed and so the wavelength multiplicity is increased.

Example 6

5,10,15,20-tetra(4-pyridyl)porphine (commercially available from Aldrich) was reacted with ethyl p-toluenesulfonate (commercially available from Tokyo Kasei) in N,N-dimethylformamide to obtain 5,10,15,20-tetra(4-N-ethylpyridinium)porphine tetra(p-toluenesulfonate) (TPyP-2(PTS)).

A solution containing 1 mg of the thus prepared TPyP-2(PTS) in heavy water and a solution containing 1 g of PVA-$d_4$ in heavy water were mixed and the mixture was stirred. This mixture was dried in nitrogen atmosphere to obtain a sample of TPyP-2(PTS)/PVA-$d_4$ in the form of a film. The concentration of the guest component was 1 mM. By the proton exchange with heavy water, the hydrogen atoms in the porphine ring of TPyP-2(PTS) were substituted with deuterium atoms. This sample was irradiated with a laser beam having a wavelength of 641 nm and an intensity of 1 mW/cm² at 31K. The half hole width was measured, which was 1.8 cm⁻¹.

Comparative Example 5

An aqueous solution containing 1 mg of TPyP-2(PTS) in distilled water and an aqueous solution containing 1 g of PVA in distilled water were mixed and the mixture was stirred. This mixture was dried in nitrogen atmosphere to obtain a sample of TPyP-2(PTS)/PVA in the form of a film. The concentration of the guest component was 1 mM. This sample was irradiated with a laser beam having a wavelength of 641 nm and an intensity of 1 mW/cm² at 31K. The half hole width was measured, which was 2.6 cm⁻¹.

Example 7

Deuterated methyl methacrylate ($D_2C=C(CD_3)CO_2CD_3$, deuteration rate: 98%, commercially available from Wako Pure Chemical Industries) was polymerized by using AIBN polymerization initiator, and the obtained deuterated polymethyl methacrylate was purified. The formation of deuterated polymethyl methacrylate was confirmed by IR and GPC. The deuterated polymethyl methacrylate was reacted with concentrated sulfuric acid so as to hydrolyze the methyl ester moiety, to obtain deuterated polymethacrylic acid (PMAA-$d_5$) represented by the formula [XII].

An aqueous solution containing 5 mg of TSPP(Na) dodecahydrate in distilled water and an aqueous solution containing 1 g of PMAA-$d_5$ in distilled water were mixed and the mixture was stirred. This mixture was dried in nitrogen atmosphere to obtain a sample of TSPP(Na)/PMAA-$d_5$ $d_5$ in the form of a film. The concentration of the guest component was 5 mM. This sample was irradiated with a laser beam having a wavelength of 641 nm and an intensity of 1 mW/cm² at 25K or 31K. The half widths of the holes were measured. The half hole widths were 3.6 cm⁻¹ and 4.4 cm⁻¹, respectively.

Comparative Example 6

Methyl methacrylate (commercially available from Wako Pure Chemical Industries) was polymerized by using AIBN polymerization initiator, and the obtained polymethyl methacrylate was purified. The formation of polymethyl methacrylate was confirmed by IR and GPC. The polymethyl methacrylate was reacted with concentrated sulfuric acid so as to hydrolyze the methyl ester moiety, to obtain polymethacrylic acid (PMAA).

An aqueous solution containing 5 mg of TSPP(Na) dodecahydrate in distilled water and an aqueous solution containing 1 g of PMAA in distilled water were mixed and the mixture was stirred. This mixture was dried in nitrogen atmosphere to obtain a sample of TSPP(Na)/PMAA in the form of a film. The concentration of the guest component was 5 mM. This sample was irradiated with a laser beam having a wavelength of 641 nm and an intensity of 1 mW/cm$^2$ at 25K or 31K. The half widths of the holes were measured. The half hole widths were 4.2 cm$^{-1}$ and 4.9 cm$^{-1}$, respectively.

As can be seen, the hole widths in Example 7 are narrower than those in Comparative Example 6. Thus, it was proved that by the deuteration of the host component (PMAA), the hole width is narrowed and so the wavelength multiplicity is increased.

Example 8

Phthalocyanine was reacted with 60% fuming sulfuric acid to obtain sulfonated phthalocyanine. The obtained sulfonated phthalocyanine was neutralized with aqueous sodium hydroxide solution to obtain water-soluble sulfonated phthalocyanine sodium salt. Elementary analysis revealed that average number of the introduced sulfonated groups was three.

A solution containing 2 mg of sulfonated phthalocyanine sodium salt in heavy water and a solution containing 1 g of PVA-d$_4$ in heavy water were mixed and the mixture was stirred. This mixture was dried in nitrogen atmosphere to obtain a sample of sulfonated phthalocyanine sodium salt/PVA-d$_4$ in the form of a film. The concentration of the guest component was 3 mM. By the proton exchange with heavy water, the hydrogen atoms in the ring of sulfonated phthalocyanine sodium salt were substituted with deuterium atoms. This sample was irradiated with a laser beam having a wavelength of 677 nm and an intensity of 1 mW/cm$^2$ at 25K. The half hole width was measured, which was 1.5 cm$^{-1}$.

Comparative Example 7

An aqueous solution containing 2 mg of sulfonated phthalocyanine sodium salt in distilled water and a solution containing 1 g of PVA in distilled water were mixed and the mixture was stirred. This mixture was dried in nitrogen atmosphere to obtain a sample of sulfonated phthalocyanine sodium salt/PVA in the form of a film. The concentration of the guest component was 3 mM. This sample was irradiated with a laser beam having a wavelength of 677 nm and an intensity of 1 mW/cm$^2$ at 25K. The half hole width was measured, which was 2.9 cm$^{-1}$.

As can be seen, the hole width in Example 8 is narrower than that in Comparative Example 7. Thus, it was proved that by the deuteration of the host component (PVA), the hole width is narrowed and so the wavelength multiplicity is increased.

Example 9

A solution containing 1.4 mg of fluorescein disodium salt (commercially available from Wako Pure Chemical Industries) in heavy water and a solution containing 1 g of PVA-d$_4$ in heavy water were mixed and the mixture was stirred. This mixture was dried in nitrogen atmosphere to obtain a sample of fluorescein disodium salt/PVA-d$_4$ in the form of a film. The concentration of the guest component was 5 mM.

This sample was irradiated with a laser beam having a wavelength of 514 nm and an intensity of 1 mW/cm$^2$ at 8K. The half hole width was measured. The temperature of the sample was raised to 40K and the sample was kept at this temperature for 15 minutes. Thereafter, the sample was cooled to 8K and the half hole width was measured. As a result, the half hole width was increased by 0.7 cm$^{-1}$ by the above-described heat cycle between 8K and 40K.

Comparative Example 8

A solution containing 1.4 mg of fluorescein disodium salt (commercially available from Wako Pure Chemical Industries) in distilled water and a solution containing 1 g of PVA in distilled water were mixed and the mixture was stirred. This mixture was dried in nitrogen atmosphere to obtain a sample of fluorescein disodium salt/PVA in the form of a film. The concentration of the guest component was 5 mM.

This sample was irradiated with a laser beam having a wavelength of 514 nm and an intensity of 1 mW/cm$^2$ at 8K. The half hole width was measured. The temperature of the sample was raised to 40K and the sample was kept at this temperature for 15 minutes. Thereafter, the sample was cooled to 8K and the half hole width was measured. As a result, the half hole width was increased by 1.3 cm$^{-1}$ by the above-described heat cycle between 8K and 40K.

As can be seen, the increase in the half hole width after the heat cycle was smaller in Example 9 than in Comparative Example 8. Thus, the recording material of the present invention has higher thermal stability than the corresponding recording material having non-deuterated host component (PVA).

Example 10

A solution containing 1.5 mg of Rhodamine 560 chloride in heavy water and a solution containing 1 g of PMAA-d$_5$ in heavy water were mixed and the mixture was stirred. This mixture was dried in nitrogen atmosphere to obtain a sample of Rhodamine 560 chloride/PMAA-d$_5$ in the form of a film. The concentration of the guest component was 5 mM.

This sample was irradiated with a laser beam having a wavelength of 514 nm and an intensity of 1 mW/cm$^2$ at 8K. The half hole width was measured. The temperature of the sample was raised to 20K and the sample was kept at this temperature for 15 minutes. Thereafter, the sample was cooled to 8K and the half hole width was measured. As a result, the half hole width was increased by 0.21 cm$^{-1}$ by the above-described heat cycle between 8K and 20K.

Comparative Example 9

An aqueous solution containing 1.5 mg of Rhodamine 560 chloride in distilled water and an aqueous solution containing 1 g of PMAA in distilled water were mixed and the mixture was stirred. This mixture was dried in nitrogen atmosphere to obtain a sample of Rhodamine 560 chloride/PMAA in the form of a film. The concentration of the guest component was 5 mM.

This sample was irradiated with a laser beam having a wavelength of 514 nm and an intensity of 1 mW/cm$^2$ at 8K. The half hole width was measured. The temperature of the sample was raised to 20K and the sample was kept at this temperature for 15 minutes. Thereafter, the sample was cooled to 8K and the half hole width was measured. As a result, the half hole width was increased by 0.56 cm$^{-1}$ by the above-described heat cycle between 8K and 20K.

As can be seen, the increase in the half hole width after the heat cycle was smaller in Example 10 than in Comparative Example 9. Thus, the recording material of the present invention has higher thermal stability than the corresponding recording material having non-deuterated host component (PMAA).

Example 11

A solution containing 1.7 mg of Nile Blue perchlorate in heavy water and a solution containing 1 g of PVA-d$_4$ in heavy water were mixed and the mixture was stirred. This mixture was dried in nitrogen atmosphere to obtain a sample of Nile Blue perchlorate/PVA-d$_4$ in the form of a film. The concentration of the guest component was 5 mM.

This sample was irradiated with a laser beam having a wavelength of 650 nm and an intensity of 1 mW/cm$^2$ at 8K. The half hole width was measured. The temperature of the sample was raised to 40K and the sample was kept at this temperature for 15 minutes. Thereafter, the sample was cooled to 8K and the half hole width was measured. As a result, the half hole width was increased by 1.0 cm$^{-1}$ by the above-described heat cycle between 8K and 40K.

Comparative Example 10

An aqueous solution containing 1.7 mg of Nile Blue perchlorate in distilled water and an aqueous solution containing 1 g of PVA in distilled water were mixed and the mixture was stirred. This mixture was dried in nitrogen atmosphere to obtain a sample of Nile Blue perchlorate/PVA in the form of a film. The concentration of the guest component was 5 mM.

This sample was irradiated with a laser beam having a wavelength of 650 nm and an intensity of 1 mW/cm$^2$ at 8K. The half hole width was measured. The temperature of the sample was raised to 40K and the sample was kept at this temperature for 15 minutes. Thereafter, the sample was cooled to 8K and the half hole width was measured. As a result, the half hole width was increased by 1.4 cm$^{-1}$ by the above-described heat cycle between 8K and 40K.

As can be seen, the increase in the half hole width after the heat cycle was smaller in Example 11 than in Comparative Example 10. Thus, the recording material of the present invention has higher thermal stability than the corresponding recording material having non-deuterated host component (PVA).

Example 12

A solution containing 1.6 mg of Methylene Blue chloride tetrahydrate (commercially available from Wako Pure Chemical Industries) in heavy water and a solution containing 1 g of PVA-d$_4$ in heavy water were mixed and the mixture was stirred. This mixture was dried in nitrogen atmosphere to obtain a sample of Methylene Blue chloride/PVA-d$_4$ in the form of a film. The concentration of the guest component was 5 mM.

This sample was irradiated with a laser beam having a wavelength of 670 nm and an intensity of 1 mW/cm$^2$ at 8K. The half hole width was measured. The temperature of the sample was raised to 40K and the sample was kept at this temperature for 15 minutes. Thereafter, the sample was cooled to 8K and the half hole width was measured. As a result, the half hole width was increased by 1.0 cm$^{-1}$ by the above-described heat cycle between 8K and 40K.

Comparative Example 11

An aqueous solution containing 1.6 mg of Methylene Blue chloride tetrahydrate (commercially available from Wako Pure Chemical Industries) in distilled water and an aqueous solution containing 1 g of PVA in distilled water were mixed and the mixture was stirred. This mixture was dried in nitrogen atmosphere to obtain a sample of Methylene Blue chloride/PVA in the form of a film. The concentration of the guest component was 5 mM.

This sample was irradiated with a laser beam having a wavelength of 670 nm and an intensity of 1 mW/cm$^2$ at 8K. The half hole width was measured. The temperature of the sample was raised to 40K and the sample was kept at this temperature for 15 minutes. Thereafter, the sample was cooled to 8K and the half hole width was measured. As a result, the half hole width was increased by 1.3 cm$^{-1}$ by the above-described heat cycle between 8K and 40K.

As can be seen, the increase in the half hole width after the heat cycle was smaller in Example 12 than in Comparative Example 11. Thus, the recording material of the present invention has higher thermal stability than the corresponding recording material having non-deuterated host component (PVA).

Example 13

The sample prepared in Example 1 was sequentially irradiated with laser beams with an intensity of 0.6 mW/cm$^2$ having wavelengths of 638.1 nm, 639.4 nm, 640.4 nm, 641.7 nm and 642.7 nm, respectively, for 30 seconds each at the temperature of liquid helium so as to form holes. The sample was then stored for 24 hours at the temperature of liquid nitrogen. The sample was then cooled to the temperature of liquid helium and the shape of the holes were measured. The results are shown in FIG. 2.

Figure 2:
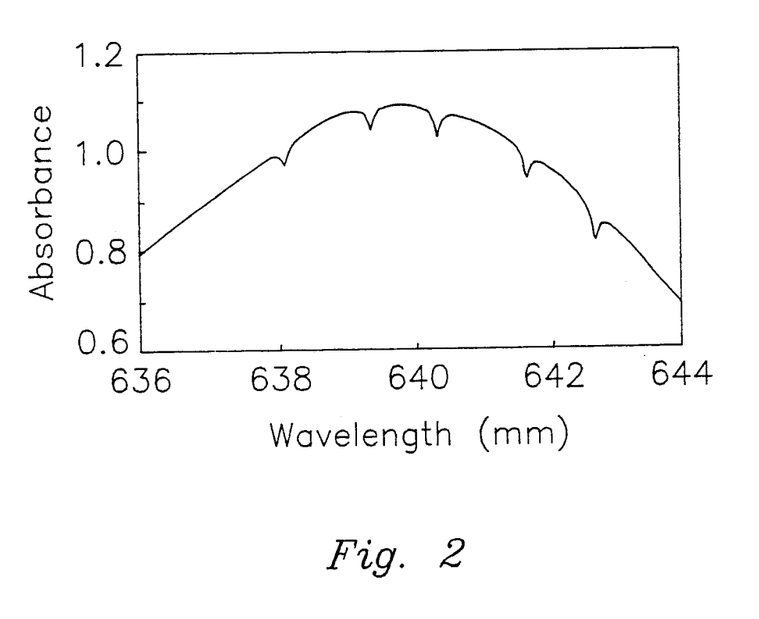
FIG. 2 shows the relationship between the wavelength and absorbance of a sample irradiated with a plurality of laser beams with different wavelengths, the measurement being made after 24 hours, storage of the sample at the temperature of liquid nitrogen.

As can be seen from FIG. 2, after the storage for 24 hours at the temperature of liquid nitrogen, the holes were clearly retained.

We claim:

1. An optical recording material comprising a water-soluble polymer as a host component, said polymer including deuterium atoms bonded to carbon atoms contained within said polymer, and a water-soluble organic pigment dispersed in said host component as a guest component, wherein at least some of said deuterium atoms are not engaged in hydrogen bonding.

2. The optical recording material of claim 1, wherein said water-soluble polymer is a hydrogen bonding polymer.

3. The optical recording material of claim 2, wherein said hydrogen bonding polymer is polyvinyl alcohol or deuterated polymethacrylic acid.

4. The optical recording material of claim 1, wherein said water-soluble pigment is a water-soluble porphine derivative.

5. The optical recording material of claim 1, wherein said water-soluble pigment is a water-soluble phthalocyanine derivative.

6. The optical recording material of claim 4, wherein said porphine derivative has an ionic substituent.

7. The optical recording material of claim 6, wherein said ionic substituent is an anionic substituent.

8. The optical recording material of claim 6, wherein said ionic substituent is a cationic substituent.

9. The optical recording material of claim 6, wherein said ionic substituent is an amphoteric ionic substituent.

10. The optical recording material of claim 7, wherein said anionic substituent is $SO_3^-$ group.

11. The optical recording material of claim 7, wherein said anionic substituent is $CO_2^-$ group.

12. The optical recording material of claim 7, wherein said anionic substituent is $O^-$.

13. The optical recording material of claim 10, wherein said water-soluble organic pigment is 5,10,15,20-tetra(4-sulfonatophenyl)porphine.

14. The optical recording material of claim 11, wherein said water-soluble organic pigment is 5,10,15,20-tetra(4-carbonatophenyl)porphine.

15. The optical recording material of claim 8, wherein said cationic substituent is a quaternary amino group.

16. The optical recording material of claim 8, wherein said cationic substituent is N-alkylpyridinium group.

17. The optical recording material of claim 15, wherein said water-soluble organic pigment is 5,10,15,20-tetra(4-N,N,N-trialkylaminophenyl)porphine.

18. The optical recording material of claim 17, wherein said water-soluble organic pigment is 5,10,15,20-tetra(4-N,N,N-trimethylaminophenyl)porphine.

19. The optical recording material of claim 16, wherein said water-soluble organic pigment is 5,10,15,20-tetra(4-N-methylpyridinium) porphine.

20. The optical recording material of claim 16, wherein said water-soluble organic pigment is 5,10,15,20-tetra(4-N-ethylpyridinium)porphine.

21. The optical recording material of claim 1, wherein said water-soluble organic pigment is a water-soluble xanthene pigment.

22. The optical recording material of claim 1, wherein said water-soluble organic pigment is a water-soluble oxazine pigment.

23. The optical recording material of claim 1, wherein said water-soluble organic pigment is a water-soluble thiazine pigment.

24. The optical recording material of claim 21, wherein said water-soluble xanthene pigment is a water-soluble fluorescein derivative or a water-soluble Rhodamine pigment.

25. The optical recording material of claim 1, wherein not less than 70% of hydrogen atoms not engaging in hydrogen bond in said water-soluble deuterated polymer are substituted with deuterium.

* * * * *

UNITED STATES PATENT AND TRADEMARK OFFICE
CERTIFICATE OF CORRECTION

PATENT NO. : 5,306,599
DATED : April 26, 1994
INVENTOR(S) : Kazuaki Sakoda et al It is certified that error appears in the above-indentified patent and that said Letters Patent is hereby corrected as shown below:

In Column 5, line 4, please delete "$C^{10}_4-$", and substitute --$ClO_4-$--.

In Column 10, line 7, please delete " " " ", first occurrence, and substitute --"○"--, also please delete " " " ", second occurrence, and substitute --"+"--. Line 8, please delete " " " ", and substitute --"●"--.

Signed and Sealed this

Second Day of August, 1994

Attest:

BRUCE LEHMAN

Attesting Officer   Commissioner of Patents and Trademarks